Oct. 27, 1953  D. F. DROW  2,657,006
FLOW CONTROL AND SHUTOFF VALVE FOR PILOT BURNERS
Filed July 27, 1948
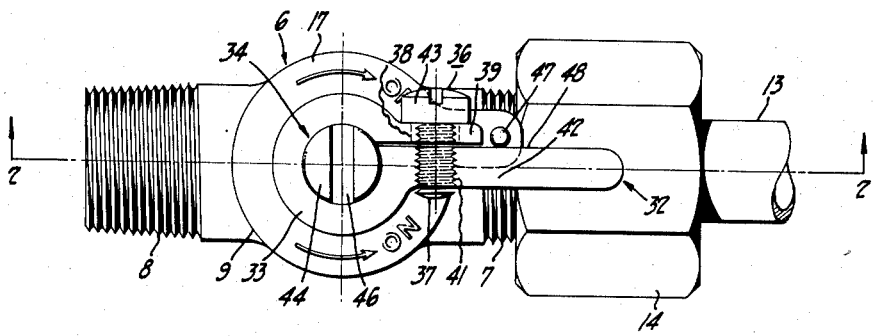
FIG_1_
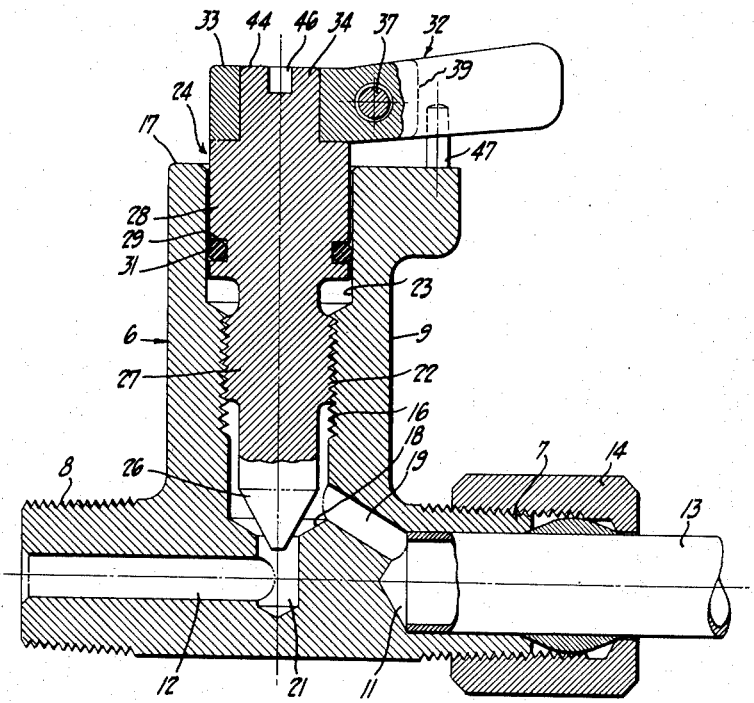
FIG_2_
INVENTOR.
Donald F. Drow
BY
Manfred M. Warren
his Attorney Patented Oct. 27, 1953

2,657,006

UNITED STATES PATENT OFFICE 2,657,006

FLOW CONTROL AND SHUTOFF VALVE FOR PILOT BURNERS

Donald F. Drow, Los Angeles, Calif., assignor, by mesne assignments, to Minneapolis-Honeywell Regulator Company, a corporation of Delaware Application July 27, 1948, Serial No. 40,839

3 Claims. (Cl. 251—45)

The invention relates to valves used for controlling the flow of gas or other fuel to a heat appliance and, more particularly, to the form of valve, commonly referred to as a B valve, for controlling the fuel flow to a constantly burning pilot burner.

In gas-fired heat appliances it is common to use a constantly burning pilot burner in conjunction with the main burner of the heat appliance and which functions to ignite the gas emerging from the main burner as the latter is periodically placed in operation under the control of a remote thermostat. A valve, commonly referred to as a B valve, is positioned in the line to the pilot burner so as to provide a ready means for shutting off the flow to the pilot when desired and additionally there is provided in this line a second valve, sometimes referred to as a C valve, for adjusting the volume of gas permitted to flow to the pilot. The most common form of B valves have been of the plug cock type wherein the valve body is formed with a tapered bore in which is mounted a conical plug properly lapped to prevent leakage. This type of construction is inherently expensive in manufacture. As an object of the present invention I provide a gas valve of the character described, incorporating within a single valve construction both the B and C valve operations, thereby eliminating one of the valves usually required and to provide a valve structure wherein the requirement for expensive lapping operations of interfitting conical parts is eliminated.

Another object of the invention is to provide a gas valve of the character described, reducing to a minimum the amount of machining of parts and wherein such machining, as is required, is of a simple nature.

A further object of the invention is to provide a valve construction of the character above having a minimum number of parts which co-act in a manner providing the dual functions aforesaid and which may be simply and readily manufactured and assembled in a small and compact unit.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a plan view of a valve constructed in accordance with the present invention.

Figure 2 is a vertical cross-sectional view of the valve taken substantially in the plane of line 2—2 of Figure 1.

The valve illustrated in the accompanying drawing is incorporated in a substantially T-shaped body 6 having generally aligned ends 7 and 8 and an intermediate portion 9 extending at generally right angles to ends 7 and 8. Ends 7 and 8 are drilled or otherwise formed to provide inlet and discharge passages 11 and 12 and may be exteriorly threaded, as here shown, for connection of inlet and discharge conduits, an inlet conduit 13 and fitting 14 therefor being here shown.

The body portion 9 is formed with a central bore 16 opening to the outer or top-side 17 of the body and terminating at its inner end in an annular tapered valve seat 18. As will be seen from Figure 2, inlet passage 11 is connected to the bore 16 adjacent valve seat 18 by means of a passage extension 19, and discharge passage 12 connects to the opposite side of the valve seat by passage extension 21. As will be also seen from this figure, an interior portion 22 of the bore is threaded and terminates at its outer end in an enlarged cylindrical portion 23 extending to the side 17 of the body.

Mounted within the bore 16 is a generally cylindrical valve plug 24 having the inner end 26 thereof tapered to provide a valve face engageable with valve seat 18. An inner portion 27 of the plug is threaded to threadably engage the bore section 22 and the plug is formed exteriorly thereof with a cylindrical enlargement 28 journaled within the bore portion 23. In this manner rotation of the plug relative to the bore will advance or retract the valve face 26 to or out of engagement with the valve seat 18, depending upon the direction of rotation of the plug in the bore. The enlarged plug section 28 is formed with a peripheral channel or recess 29 in which is mounted a sealing ring 31 engageable with the walls of the recess and the interior wall 23 of the bore so as to seal the plug in the bore. Preferably, the recess 29 is of substantially rectangular cross-section, while the ring gasket 31 is of near circular cross-section so that on compression of the ring within the recess and against the bore wall 23, a desired sealing engagement of the ring with the several walls of the recess and the bore wall is effected. The sealing ring is preferably formed of neoprene, Hycar or similar gas resistant compressible material suitable for gasketing purposes.

Rotation of the plug within the bore to open and close the valve is conveniently effected by a lever type handle 32 formed at one end thereof with a circular band 33 adapted to embrace a reduced cylindrical end 34 of the plug projecting exteriorly from the side 17 of the body. As an important feature of the present construction, the band 33 may be cinched upon the plug end 34 in any desired preselected rotative position of the plug within the bore. This is here accomplished by a screw 36 having the threaded stem 37 thereof mounted through an aperture 38 in one end 39 of band 33 and threaded through an aligned threaded opening 41 in a straight portion 42 of handle 32 onto which the band end 39 is overlapped. Turning of the head end 43 of screw 36 in a clockwise direction will clamp the ring end 39 against the screw head and thereby cinch the ring to a clamped position on the plug end 34. A reverse turning of the screw will permit an opening of the ring 33 to release the plug end 34 for relative rotation between the handle and the plug.

A preadjustment of the valve corresponding to a desired maximum open position thereof is herein effected by turning the plug independent of the handle 32. This is accomplished by the provision in the end face 44 of the plug end 34 of a tool engaging form, such as a screw driver slot 46, which may be engaged by a screw driver in the loosened position of the handle ring 33 for turning the plug relative to the handle. The valve open position of handle 32 is here fixed by a stop pin 47 projecting from the end face 17 of the body and engageable with one side 48 of the handle. To set the device, screw 36 is loosened so as to free the handle from the plug and the handle is swung in a counter-clockwise position against stop 47. A screw driver is then applied to the slot 46 in the end face of the plug exposed within the clamp ring 33, and the plug turned to adjust the amount of gas passing to the pilot burner. The pilot burner may then be ignited and the plug rotated by means of the screw driver until the desired normal steady flow of gas is obtained, thereby setting the normal height and size of the pilot flame. After such setting, screw 36 is tightened so as to cinch the handle 32 upon the end 34 of the plug for joint rotation. Movement of the handle after such tightening, in a clockwise direction, as viewed in Figure 1, will rotate the plug into the bore and thereby cause the valve face 26 to engage valve seat 18. Preferably, the pitch of the inter-engaged threads on the bore and plug section 22 and 27 are such as to cause a full movement of the valve face 26 from its preselected open position to its closed position, and vice versa, in less than one revolution of the handle. Accordingly, upon movement of the handle from the stop 47, as above described, the valve will be displaced to closed position before the handle is displaced through a full circle to the other side of the stop. If, after the device has been adjusted and placed in operation as above described, it is desirable to either increase or decrease the amount of gas flow to the pilot, it is only necessary to loosen screw 36, again move the handle to stop 47, rotate the valve plug by a screw driver or the like to a new desired setting, and thereafter again tighten screw 36.

In this manner, and as will now be understood, both the B and C valve functions of turning on and off of the valve and for adjusting the normal gas flow through the valve are provided in the unitary single valve construction of the present invention. As will also be clear the several functions of the valve are accomplished with the use of a minimum number of parts designed for simple and ready machining and assembly and in which the rather difficult and expensive lapped tapered fitting of the valve parts hereinabove referred to are completely avoided and eliminated. It will also be noted that the valve is effectively sealed within the valve body by the use of a single simple gasket and the usual packing glands involving a multiplicity of parts is likewise eliminated.

I claim:

1. A gas valve comprising, a valve body having a threaded bore opening to a side of said body and formed with an annular valve seat at the inner end of said bore, said body having inlet and discharge passages opening to said bore and to the opposite sides of said valve seat, a valve plug threaded in said bore and having a valve face at its inner end movable into and out of sealed engagement with said valve seat upon rotation of said plug in said bore in opposite directions, and providing a maximum desired valve opening within one revolution of said plug, the outer end of said plug being of substantially cylindrical shape with the end face thereof formed with a tool engaging portion to effect turning of said plug in said bore, an operating handle having a clamp portion at one end formed with a circular ring portion embracing said cylindrical plug end to permit relative rotation of said ring portion and said plug end while exposing said end face for tool engagement, means for cinching said ring portion on said plug end for joint rotation of said handle and plug at a desired relative rotative position of said plug end and handle, and stop means provided on said body side engageable with said handle for limiting rotation thereof to not over one revolution, said parts cooperating to permit manual holding of said handle against said stop means and upon loosening of said ring portion independently rotating said valve plug to maximum desired valve opening and while still retaining said handle against said stop means cinching said ring portion upon said plug end to thereby set the maximum opening of said plug in the ensuing operation of said valve.

2. A gas valve comprising, a valve body formed with a bore opening to a side of said body, an interior portion of said bore being threaded and an exterior portion of said bore adjacent said side being of enlarged cylindrical shape, said bore being formed at its interior end with an annular valve seat, said body being provided with inlet and discharge passages opening to said bore adjacent said seat and to the opposite side of said seat, a generally cylindrical valve member having an interior part threadably engaged in said interior bore portion and an exterior enlarged cylindrical part journalled in said exterior bore portion and having a cylindrical outer end projecting from said body side, the inner end of said member defining a valve face movable into and out of engagement with said seat upon rotation of said member in said bore, the interengaged threads of said bore and member being arranged to provide a maximum desired opening of said valve face from said seat within one revolution of said member, said exterior part of said member being formed with a peripheral groove, a gasket mounted in said groove and engaging the exterior portion of said bore for sealing said member therein, said outer end having an end face formed with a tool engaging portion for effecting rotation of said member in said bore, a handle having a circular clamp end embracing said cylindrical outer end of said member while leaving said end face exposed, means for clamping said handle to said outer end in a preselected position of said member relative to said handle and to said bore, and stop means on said body side engageable with said handle for limiting rotary movement thereof to not over one revolution, said parts cooperating to permit manual holding of said handle against said stop means and upon loosening of said clamping means independently rotating said valve member to maximum desired valve opening and while still retaining said handle against said stop means tightening said clamp means to thereby set the maximum opening of said valve in its ensuing operation.

3. A gas valve comprising, a valve body formed with an interior valve chamber and a valve seat therein, a valve mounted in said chamber and movable to and from said seat to provide closed and open positions respectively and being formed with a stem having an operative connection to said body and having an end portion projecting therefrom, said connection providing for the movement of said valve to and from said seat upon rotation of said stem end portion in opposite directions, a handle having a part surrounding and journalled upon said stem end portion to permit relative rotary movement therebetween, manually operable means for releasably clamping said part upon said stem end portion for joint rotation therewith, stop means mounted on said body in position to engage and halt the rotary movement of said handle in valve opening direction, and a tool engaging portion provided on said end portion formed for rotating said stem whereby when said clamp means is loosened said handle may be held against said stop means and said stem independently rotated to a desired maximum open position of said valve and thereafter and while said handle remains held against said stop means said clamp means may be tightened to set the maximum open position of said valve.

DONALD F. DROW.

References Cited in the file of this patent

UNITED STATES PATENTS

| Number | Name | Date |
| --- | --- | --- |
| 304,874 | Thompson | Sept. 9, 1884 |
| 752,828 | Devine | Feb. 23, 1904 |
| 948,036 | Best | Feb. 1, 1910 |
| 1,136,108 | Curtis | Apr. 20, 1915 |
| 1,213,484 | Hein | Jan. 23, 1917 |
| 1,392,547 | Willis | Oct. 4, 1921 |
| 1,457,315 | Mueller | June 5, 1923 |
| 1,468,172 | Schulenberg | Sept. 18, 1923 |
| 1,484,350 | Cusick | Feb. 19, 1923 |
| 1,746,055 | Roberts | Feb. 4, 1930 |
| 1,802,002 | Campbell | Apr. 21, 1931 |
| 1,901,979 | Meusy | Mar. 21, 1933 |
| 2,247,090 | Jones | June 24, 1941 |
| 2,395,906 | Owens | Mar. 5, 1946 |
| 2,525,928 | McRae | Oct. 17, 1950 |